US011922902B2

(12) United States Patent
Uchino et al.

(10) Patent No.: US 11,922,902 B2

(45) Date of Patent: Mar. 5, 2024

(54) IMAGE PROCESSOR, DISPLAY DEVICE HAVING THE SAME AND OPERATION METHOD OF DISPLAY DEVICE

(71) Applicant: Samsung Display Co., Ltd., Yongin-Si (KR)

(72) Inventors: Satoshi Uchino, Yokohama (JP); Kazuhiro Matsumoto, Yokohama (JP); Masahiko Takiguchi, Yokohama (JP); Yasuhiko Shinkaji, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/405,471

(22) Filed: Aug. 18, 2021

(65) Prior Publication Data

US 2022/0157275 A1 May 19, 2022

(30) Foreign Application Priority Data

Nov. 19, 2020 (KR) ........................ 10-2020-0155996

(51) Int. Cl.

| | |
|---|---|
| ***G09G 5/18*** | (2006.01) |
| ***G09G 3/3233*** | (2016.01) |
| ***G09G 3/3291*** | (2016.01) |
| ***G09G 5/08*** | (2006.01) |

(52) U.S. Cl.

CPC ............. *G09G 5/18* (2013.01); *G09G 3/3233* (2013.01); *G09G 3/3291* (2013.01); *G09G 5/08* (2013.01); *G09G 2300/0861* (2013.01); *G09G 2310/0297* (2013.01)

(58) Field of Classification Search

CPC ...... G09G 5/18; G09G 3/3233; G09G 3/3291; G09G 5/08; G09G 2300/0861; G09G 2310/029

See application file for complete search history.

(56) References Cited

U.S. PATENT DOCUMENTS

| | | | | |
|---|---|---|---|---|
| 9,418,591 | B2 | 8/2016 | Kim et al. | |
| 2010/0045709 | A1* | 2/2010 | Nakamura ........... | G09G 3/3233 345/690 |
| 2018/0204509 | A1* | 7/2018 | Lu ........................ | G09G 3/3406 |
| 2020/0312240 | A1* | 10/2020 | Lhee .................... | G09G 3/3225 |
| 2022/0103836 | A1* | 3/2022 | Lu ........................ | H04N 21/233 |

FOREIGN PATENT DOCUMENTS

| | | | |
|---|---|---|---|
| JP | 2007173199 | A | 7/2007 |
| JP | 4932624 | B2 | 5/2012 |
| JP | 6013987 | B2 | 10/2016 |
| JP | 2017119858 | A | 7/2017 |
| KR | 101947125 | B1 | 2/2019 |

* cited by examiner

*Primary Examiner* — Roy P Rabindranath

(74) *Attorney, Agent, or Firm* — CANTOR COLBURN LLP

(57) ABSTRACT

An image processor of a display device includes: an image sticking object detector which classifies a class of an input image data and outputs inference data including image sticking object information based on the classified class; a memory which stores previous inference data; a post-processor which calculates accumulative inference data, based on the inference data and the previous inference data received from the memory and generates corrected inference data, based on the accumulative inference data; and an image sticking prevention part which outputs an image data subjected to an image sticking prevention process, based on the corrected inference data.

20 Claims, 13 Drawing Sheets

FIG. 7B

BID

| | | | | | | | | |
|---|---|---|---|---|---|---|---|---|
| 0 | 1 | 1 | 1 | 0 | 0 | 0 | 0 | 0 |
| 0 | 0 | 1 | 1 | 1 | 1 | 0 | 0 | 0 |
| 0 | 1 | 1 | 1 | 1 | 1 | 1 | 0 | 0 |
| 0 | 0 | 1 | 0 | 1 | 1 | 1 | 1 | 0 |
| 0 | 1 | 1 | 1 | 1 | 1 | 1 | 1 | 0 |
| 0 | 1 | 1 | 1 | 1 | 0 | 1 | 1 | 1 |
| 0 | 1 | 1 | 1 | 1 | 1 | 1 | 1 | 0 |
| 0 | 0 | 1 | 0 | 1 | 1 | 1 | 1 | 0 |
| 0 | 0 | 1 | 1 | 1 | 0 | 1 | 1 | 1 |
| 0 | 1 | 1 | 1 | 1 | 0 | 0 | 1 | 1 |
| 0 | 1 | 1 | 1 | 1 | 0 | 0 | 1 | 1 |

FIG. 7C

PID

| | | | | | | | | |
|---|---|---|---|---|---|---|---|---|
| 0.2 | 0.8 | 0.6 | 0.7 | 0.2 | 0.4 | 0.2 | 0.1 | 0.1 |
| 0.2 | 0.6 | 0.9 | 0.9 | 0.6 | 0.8 | 0.4 | 0.3 | 0.1 |
| 0.3 | 0.6 | 0.8 | 0.9 | 0.9 | 0.8 | 0.7 | 0.2 | 0.3 |
| 0.2 | 0.7 | 0.9 | 0.8 | 0.9 | 0.6 | 0.8 | 0.6 | 0.2 |
| 0.3 | 0.7 | 0.7 | 0.9 | 0.9 | 0.8 | 0.9 | 0.6 | 0.2 |
| 0.6 | 0.7 | 0.9 | 0.9 | 0.9 | 0.9 | 0.9 | 0.8 | 0.7 |
| 0.7 | 0.6 | 0.9 | 0.9 | 0.9 | 0.8 | 0.9 | 0.9 | 0.8 |
| 0.6 | 0.6 | 0.8 | 0.8 | 0.9 | 0.7 | 0.8 | 0.9 | 0.8 |
| 0.7 | 0.8 | 0.9 | 0.9 | 0.8 | 0.2 | 0.7 | 0.9 | 0.8 |
| 0.7 | 0.8 | 0.9 | 0.9 | 0.8 | 0.2 | 0.2 | 0.8 | 0.9 |
| 0.6 | 0.8 | 0.9 | 0.8 | 0.7 | 0.1 | 0.1 | 0.9 | 0.9 |

FIG. 7D

AID_i

| | | | | | | | | |
|---|---|---|---|---|---|---|---|---|
| 0.1 | 0.7 | 0.5 | 0.6 | 0.1 | 0.3 | 0.1 | 0 | 0 |
| 0.1 | 0.5 | 0.8 | 0.8 | 0.5 | 0.7 | 0.3 | 0.2 | 0 |
| 0.2 | 0.5 | 0.7 | 0.8 | 0.8 | 0.7 | 0.6 | 0.1 | 0.2 |
| 0.1 | 0.6 | 0.8 | 0.7 | 0.8 | 0.5 | 0.7 | 0.5 | 0.1 |
| 0.2 | 0.6 | 0.6 | 0.8 | 0.8 | 0.7 | 0.8 | 0.5 | 0.1 |
| 0.5 | 0.6 | 0.8 | 0.8 | 0.8 | 0.8 | 0.8 | 0.7 | 0.6 |
| 0.6 | 0.5 | 0.8 | 0.8 | 0.8 | 0.7 | 0.8 | 0.8 | 0.7 |
| 0.5 | 0.5 | 0.7 | 0.7 | 0.8 | 0.6 | 0.7 | 0.8 | 0.7 |
| 0.6 | 0.7 | 0.8 | 0.8 | 0.7 | 0.1 | 0.6 | 0.8 | 0.7 |
| 0.6 | 0.7 | 0.8 | 0.8 | 0.7 | 0.1 | 0.1 | 0.7 | 0.8 |
| 0.5 | 0.7 | 0.8 | 0.7 | 0.6 | 0 | 0 | 0.8 | 0.8 |

IMAGE PROCESSOR, DISPLAY DEVICE HAVING THE SAME AND OPERATION METHOD OF DISPLAY DEVICE

This application claims priority to Korean Patent Application No. 10-2020-0155996 filed on Nov. 19, 2020, and all the benefits accruing therefrom under 35 U.S.C. § 119, the content of which in its entirety is herein incorporated by reference.

BACKGROUND

Embodiments of the present disclosure described herein relate to a display device, and more particularly, relate to a display device including an image processor.

In general, a display device includes a display panel for displaying an image and a driving circuit for driving the display panel. The display panel includes a plurality of scan lines, a plurality of data lines, and a plurality of pixels. The driving circuit includes a data driving circuit that outputs a data driving signal to the data lines, a scan driving circuit that outputs a scan signal for driving the scan lines, and a driving controller that controls the data driving circuit and the scan driving circuit.

The driving circuit of the display device may display an image by outputting the scan signal to the scan line connected to a pixel and providing a data voltage corresponding to a display image to the data line connected to the pixel.

The driving circuit of the display device may include an image processor that converts an input image data into a data voltage suitable for the display panel.

SUMMARY

Embodiments of the present disclosure provide an image processor and a display device capable of improving display quality.

Embodiments of the present disclosure provide a method of operating a display device capable of improving display quality.

According to an embodiment of the present disclosure, an image processor includes: an image sticking object detector which classifies a class of an input image data and outputs inference data including image sticking object information based on the classified class; a memory which stores previous inference data; a post-processor which calculates final accumulative inference data, based on the inference data and the previous inference data received from the memory and generates corrected inference data, based on the final accumulative inference data; and an image sticking prevention part which outputs an image data subjected to an image sticking prevention process, based on the corrected inference data.

According to an embodiment, the image sticking object detector may classify the input image data as a first class when the input image data corresponds to a background, may classify the input image data as a second class when the input image data corresponds to a clock, and may classify the input image data as a third class when the input image data corresponds to broadcast information.

According to an embodiment, the post-processor may include: a binary converter which converts the inference data received from the image sticking object detector into binary inference data; a data accumulator which calculates initial accumulative inference data and the final accumulative inference data, based on the binary inference data and the previous inference data; and a corrector which outputs the corrected inference data, based on the final accumulative inference data.

According to an embodiment, the binary converter may convert a class corresponding to a background in the inference data into a first value, and may convert a class corresponding to an image sticking object in the inference data into a second value.

According to an embodiment, when a difference between the binary inference data and the initial accumulative inference data is greater than a reference value, the data accumulator may discard the initial accumulative inference data and may set the binary inference data as the final accumulative inference data.

According to an embodiment, the data accumulator may store the final accumulative inference data as the previous inference data in the memory.

According to an embodiment, when a difference between the binary inference data and the initial accumulative inference data is less than a reference value, the data accumulator may store the initial accumulative inference data as the previous inference data in the memory.

According to an embodiment, when a value of the final accumulative inference data is less than a correction reference value, the corrector may correct the final accumulative inference data to a class corresponding to a background, and when the value of the final accumulative inference data is greater than or equal to the correction reference value, the corrector may output the corrected inference data obtained by correcting the final accumulative inference data to a class corresponding to an image sticking object.

According to an embodiment, the data accumulator may calculate the initial accumulative inference data, based on a sum of the binary inference data and the previous inference data.

According to an embodiment, the initial accumulative inference data may be calculated by the following equation: $AID=BID\times R+PID\times(1-R)$, where AID may the initial accumulative inference data, BID may be the binary inference data, PID may be the previous inference data, and 'R' may be a reflection ratio of the binary inference data to the previous inference data.

According to an embodiment of the present disclosure, a display device includes: a display panel including a plurality of pixels which are connected to a plurality of data lines and a plurality of scan lines; a data driving circuit which drives the plurality of data lines; a scan driving circuit which drives the plurality of scan lines; and a driving controller which receives a control signal and an image signal, controls the scan driving circuit such which an image is displayed on the display panel, and provides a image data to the data driving circuit. The driving controller includes: an image sticking object detector which classifies a class of the input image data and outputs inference data including image sticking object information, based on the classified class; a memory which stores previous inference data; a post-processor which calculates final accumulative inference data, based on the inference data and the previous inference data received from the memory and generates corrected inference data, based on the final accumulative inference data; and an image sticking prevention part which outputs the image data subjected to an image sticking prevention process, based on the corrected inference data.

According to an embodiment, the image sticking object detector may classify the input image data as a first class when the input image data corresponds to a background, may classify the input image data as a second class when the input image data corresponds to a clock, and may classify the input image data as a third class when the input image data corresponds to broadcast information.

According to an embodiment, the post-processor may include: a binary converter which converts the inference data received from the image sticking object detector into binary inference data; a data accumulator which calculates initial accumulative inference data and the final accumulative inference data, based on the binary inference data and the previous inference data; and a corrector which outputs the corrected inference data, based on the final accumulative inference data.

According to an embodiment, the binary converter may convert a class corresponding to a background in the inference data into a first value, and may convert a class corresponding to an image sticking object in the inference data into a second value.

According to an embodiment, when a difference between the binary inference data and the initial accumulative inference data is greater than a reference value, the data accumulator may discard the initial accumulative inference data and may set the binary inference data as the final accumulative inference data.

According to an embodiment, the data accumulator may store the final accumulative inference data as the previous inference data in the memory.

According to an embodiment, the data accumulator may calculate the initial accumulative inference data, based on a sum of the binary inference data and the previous inference data.

According to an embodiment of the present disclosure, a method of driving a display device includes: classifying a class of an input image data, and outputting inference data including image sticking object information, based on the classified class; calculating final accumulative inference data, based on the inference data and previous inference data from a memory; generating corrected inference data, based on the final accumulative inference data; and outputting an image data subjected to an image sticking prevention process based on the corrected inference data, to a data line of the display device.

According to an embodiment, the calculating of the final accumulative inference data may include: converting the inference data into binary inference data; and calculating initial accumulative inference data and the final accumulative inference data, based on the binary inference data and the previous inference data.

According to an embodiment, when a difference between the binary inference data and the initial accumulative inference data is greater than a reference value, the calculating of the accumulative inference data may include discarding the initial accumulative inference data, and setting the binary inference data as the final accumulative inference data.

BRIEF DESCRIPTION OF THE FIGURES

The above and other objects and features of the present disclosure will become apparent by describing in detail embodiments thereof with reference to the accompanying drawings.

FIG. 7B is a diagram illustrating binary inference data corresponding to a region of FIG. 6A.

FIG. 7C is a diagram illustrating previous inference data corresponding to a region of FIG. 6A.

FIG. 7D is a diagram illustrating initial accumulative inference data corresponding to a region of FIG. 6A.

DETAILED DESCRIPTION

Figure 1:
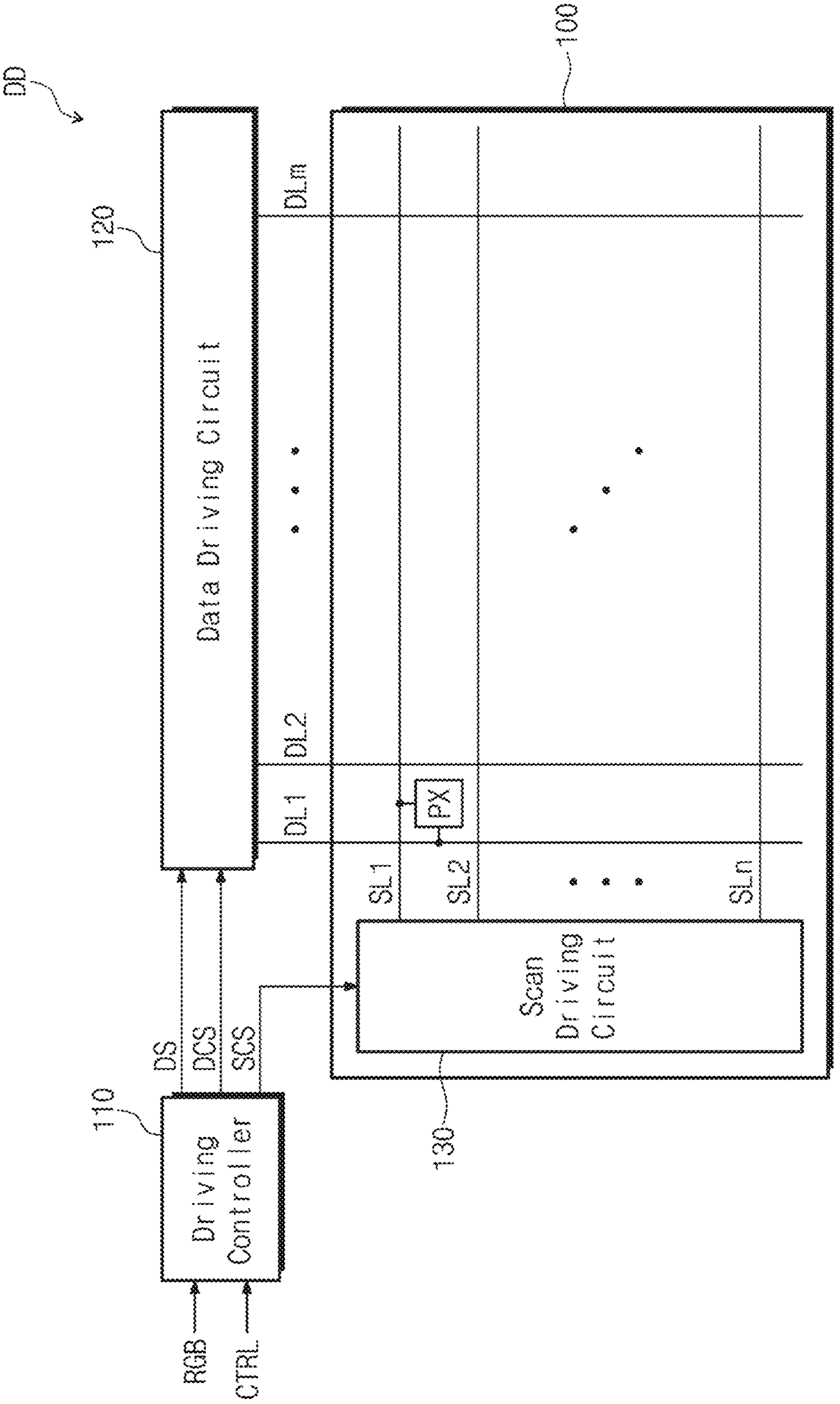
FIG. 1 is a diagram illustrating a display device according to an embodiment of the present disclosure.

In the present specification, when an element (or region, layer, portion, etc.) is referred to as being “connected” or “coupled” to another element, it means that it may be connected or coupled directly to the other element, or a third element may be interposed between them.

The same reference numerals refer to the same elements. Also, in drawings, thicknesses, proportions, and dimensions of elements may be exaggerated to describe the technical features effectively. The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “At least one” is not to be construed as limiting “a” or “an.” “Or” means “and/or.” The term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Although the terms "first", "second", etc. may be used herein to describe various elements, such elements should not be construed as being limited by these terms. These terms are only used to distinguish one element from the other. For example, a first element may be referred to as a second element, without departing the scope of the present disclosure, and similarly, a second element may be referred to as a first element. Singular expressions include plural expressions unless the context clearly indicates otherwise.

It will be understood that terms such as "comprise" or "have" specify the presence of features, numbers, steps, operations, elements, components, or combinations thereof described in the specification, but do not preclude the presence or additional possibility of one or more other features, numbers, steps, operations, elements, components, combinations thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

The terms "part" and "unit" mean a software component or a hardware component that performs a specific function. The hardware component may include, for example, a field-programmable gate array ("FPGA") or an application-specific integrated circuit ("ASIC"). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays or variables.

Hereinafter, embodiments of the present disclosure will be described with reference to accompanying drawings.

FIG. 1 illustrates a display device according to an embodiment of the present disclosure.

Referring to FIG. 1, a display device DD includes a display panel 100, a driving controller 110, and a data driving circuit 120.

The display panel 100 includes a plurality of pixels PX, a plurality of data lines DL1 to DLm, and a plurality of scan lines SL1 to SLn. Here, m and n are natural numbers. Each of the plurality of pixels PX is connected to a corresponding one of the plurality of data lines DL1 to DLm, and is connected to a corresponding one of the plurality of scan lines SL1 to SLn.

The display panel 100 is a panel that displays an image, and may be a Liquid Crystal Display Panel ("LCD") panel, an electrophoretic display panel, an Organic Light Emitting Diode Panel ("OLED") panel, a Light Emitting Diode Panel ("LED") panel, an Inorganic Electro Luminescent ("EL") display panel, a Field Emission Display ("FED") panel, a Surface-conduction Electron-emitter Display ("SED") panel, a Plasma Display Panel ("PDP"), or a Cathode Ray Tube ("CRT") display panel. Hereinafter, as a display device according to an embodiment of the present disclosure, a liquid crystal display will be described as an example, and the display panel 100 will also be described as a liquid crystal display panel. However, the display device DD and the display panel 100 of the present disclosure are not limited thereto, and various types of display devices and display panels may be used.

The driving controller 110 receives an input image data RGB and a control signal CTRL, for controlling a display of the input image data RGB, from the outside. In an embodiment, the control signal CTRL may include at least one synchronization signal and at least one clock signal. The driving controller 110 provides an image data DS to the data driving circuit 120. The image data DS is obtained by processing the input image data RGB to meet an operating condition of the display panel 100. The driving controller 110 provides a first control signal DCS to the data driving circuit 120 and provides a second control signal SCS to a scan driving circuit SDC, based on the control signal CTRL. The first control signal DCS may include a horizontal synchronization start signal, a clock signal, and a line latch signal, and the second control signal SCS may include a vertical synchronization start signal and an output enable signal.

The data driving circuit 120 may output gray voltages for driving the plurality of data lines DL1 to DLm in response to the first control signal DCS and the image data DS received from the driving controller 110. In an embodiment, the data driving circuit 120 may be directly mounted on a predetermined region of the display panel 100 by being implemented as an integrated circuit ("IC"), or may be mounted on a separate printed circuit board in a chip-on-film ("COF") method, and may be electrically connected to the display panel 100. In another embodiment, the data driving circuit 120 may be formed on the display panel 100 by using the same process as the driving circuit of the pixels PX.

A scan driving circuit 130 drives the plurality of scan lines SL1 to SLn in response to the second control signal SCS received from the driving controller 110. In an embodiment, the scan driving circuit 130 may be formed on the display panel 100 by using the same process as the driving circuit of the pixels PX, but the invention is not limited thereto. In another embodiment, the scan driving circuit 130 may be directly mounted on a predetermined region of the display panel 100 by being implemented as an integrated circuit (IC), or may be mounted on a separate printed circuit board in the COF (chip on film) method, and may be electrically connected to the display panel 100.

Figure 2:
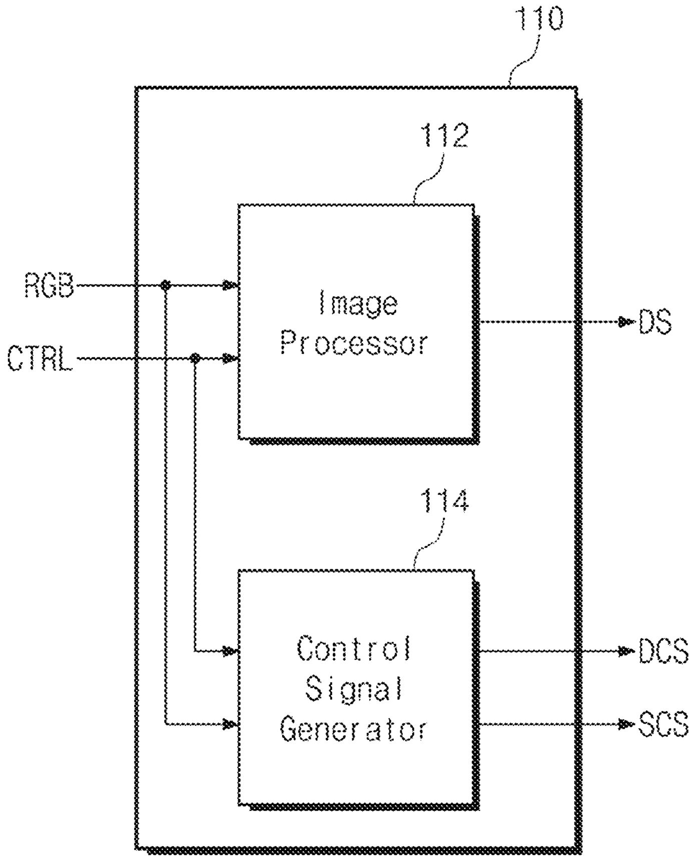
FIG. 2 is a block diagram illustrating a driving controller according to an embodiment of the present disclosure.

FIG. 2 is a block diagram of a driving controller according to an embodiment of the present disclosure.

As illustrated in FIG. 2, the driving controller 110 includes an image processor 112 and a control signal generator 114.

The image processor 112 outputs the image data DS suitable for the display panel 100 (refer to FIG. 1) in response to the image signal RGB and the control signal CTRL. In an embodiment, the image processor 112 may detect a specific image such as a logo of a broadcaster or a clock included in the image signal RGB, and may output the image data DS to which an image sticking (or afterimage) prevention technology is applied such that an image sticking by a specific image does not remain on the display panel 100.

The control signal generator 114 outputs the first control signal DCS and the second control signal SCS in response to the image signal RGB and the control signal CTRL.

Figure 3:
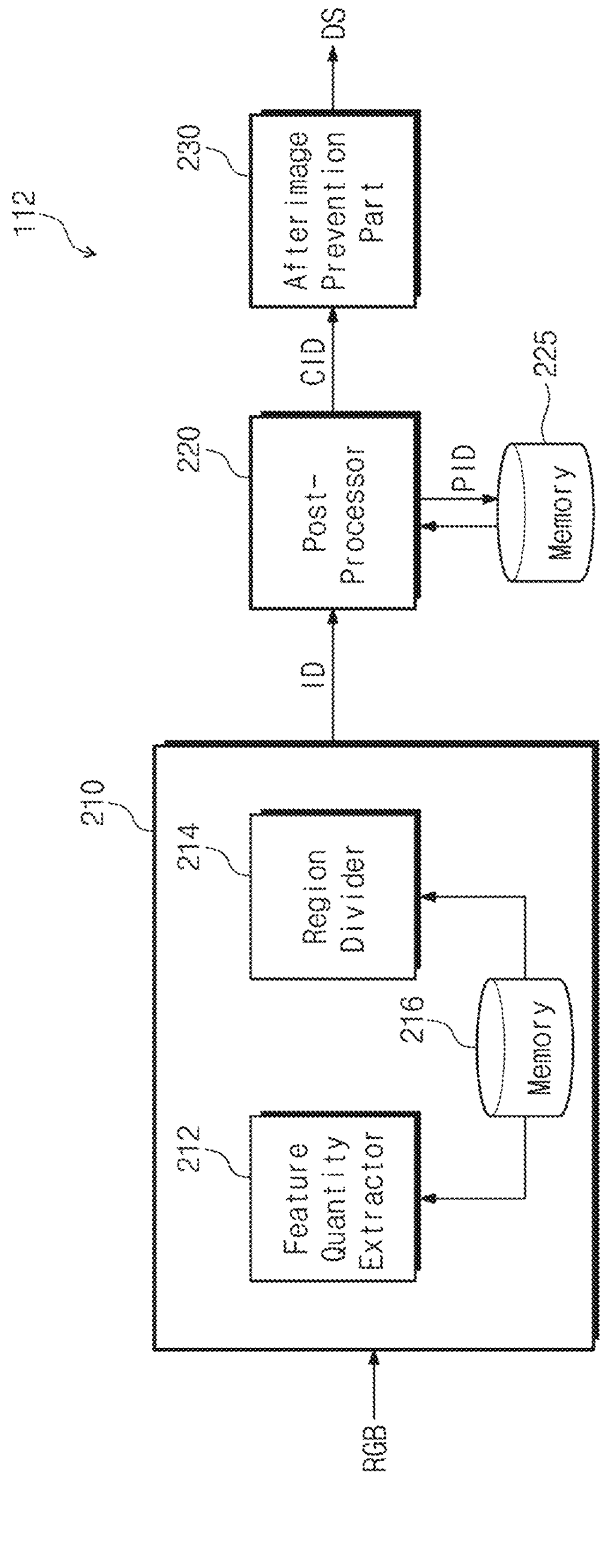
FIG. 3 is a block diagram illustrating an image processor according to an embodiment of the present disclosure.

FIG. 3 is a block diagram of an image processor according to an embodiment of the present disclosure.

Referring to FIG. 3, the image processor 112 includes an image sticking object detector 210, a post-processor 220, and an image sticking prevention part 230.

The image sticking object detector 210 receives the input image data RGB and detects an object that may cause an image sticking, that is, an image sticking object. The image sticking object detector 210 outputs information on the image sticking object as inference data ID. The image sticking object detector 210 may be implemented by applying a semantic segmentation technique using a deep neural network ("DNN").

The image sticking object detector 210 may include a feature quantity extractor 212, a region divider 214, and a memory 216.

The memory 216 may store parameters learned in advance.

The input image data RGB may be an image signal of one frame that may be displayed on the entire display panel 100 (refer to FIG. 1). The input image data RGB, which is an image signal of one frame, may include a pixel image signal corresponding to each of the pixels PX (refer to FIG. 1).

The image sticking object detector 210 classifies a class (or classification number) of the pixel image signal corresponding to each of the pixels PX (refer to FIG. 1), and outputs the inference data ID indicating the class of the pixel image signal.

Figure 4:
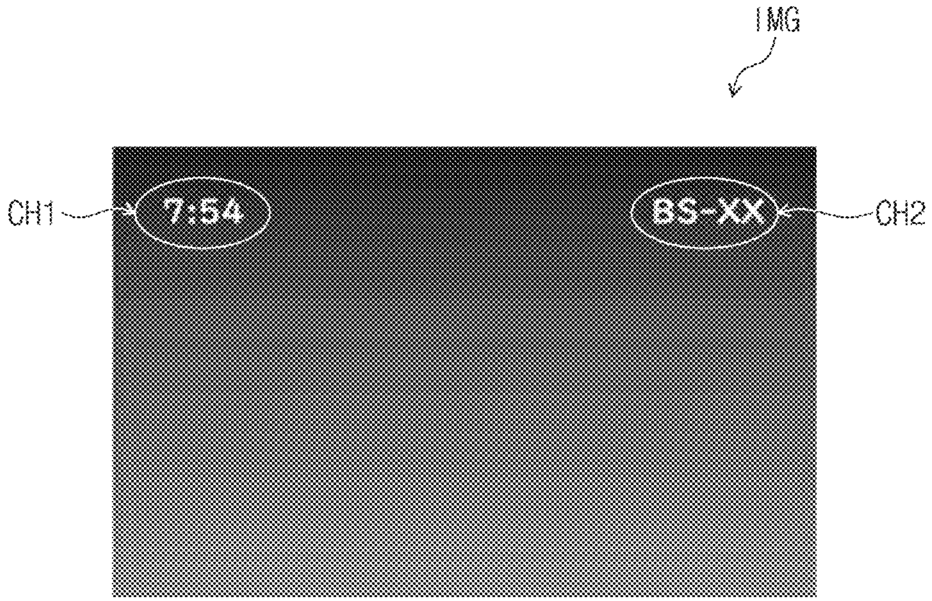
FIG. 4 is a diagram illustrating an image displayed on a display device.

FIG. 4 illustrates an image displayed on a display device as an example.

Referring to FIG. 4, an image IMG is an example of an image displayed on a display device such as a television, a digital signage, and a kiosk. The image IMG may include a first character region CH1 in which a clock is displayed, and a second character region CH2 in which broadcasting information such as a broadcaster logo, broadcaster channel information, and a program name is displayed. In FIG. 4, the first character region CH1 is located at the upper left of the image IMG, and the second character region CH2 is located at the upper right of the image IMG, but the present disclosure is not limited thereto. In addition, the number of character regions displayed on the image IMG may be one or more.

Objects such as the clock, the broadcaster logo, the broadcaster channel information, and the program name may be fixed to a specific location of the display device and may be displayed for a long time. For example, the hour on the clock that displays hours and minutes does not change for one hour. In addition, a user may continuously watch a specific channel of a specific broadcaster for several tens of minutes to several hours. In this case, the broadcaster logo, the broadcaster channel information, the program name, etc. do not change for several tens of minutes to several hours.

When the pixel PX (refer to FIG. 1) continuously displays the same image for a long time, characteristics of the pixel may be deteriorated, and such an image may remain as the image sticking. For example, when a user continuously watches a specific channel of a specific broadcaster for several hours and then changes to another channel, the logo of the previous channel remains as the image sticking and may be recognized in a form overlapping a logo of the new channel.

In an embodiment of the present disclosure, the display device DD may minimize an image sticking of the image by accurately detecting an image sticking-causing object, that is, an image sticking object, displayed on the first character region CH1 and the second character region CH2 and by performing compensation accordingly.

Referring back to FIG. 3, the feature quantity extractor 212 and the region divider 214 may classify the pixel image signal into any one of a plurality of classes by using parameters stored in the memory 216. In an embodiment, the feature quantity extractor 212 and the region divider 214 may classify a pixel image signal as a first class "0" when the pixel image signal is inferred as a background, may classify a pixel image signal as a second class "1" when the pixel image signal is inferred as a clock, and may classify a pixel image signal as a third class "2" when the pixel image signal is inferred as broadcaster information.

In an embodiment, in the pixel image signals corresponding to the first character region CH1 illustrated in FIG. 4, the background may be classified as the first class "0", and the clock may be classified as the second class "1".

In an embodiment, in the pixel image signals corresponding to the second character region CH2 illustrated in FIG. 4, the background may be classified as the first class "0", and the broadcaster information may be classified as the third class "2".

The image sticking object detector 210 outputs the inference data ID including the classified class information.

The post-processor 220 outputs corrected inference data CID, based on the inference data ID received from the image sticking object detector 210 and a previous inference data PID stored in a memory 225.

The memory 225 may store final accumulative inference data AID (will be described later) as the previous inference data PID. Although the memory 216 and the memory 225 are illustrated independently in FIG. 3, the memory 216 and the memory 225 may be implemented as a single memory in another embodiment.

The image sticking prevention part 230 may receive the corrected inference data CID and may output the image data DS subjected to an image sticking prevention process. That is, image sticking prevention part 230 may output the image data DS that is processed to prevent image sticking. In the image sticking prevention processing operation of the image sticking prevention part 230, a method such as periodically changing a display position of the image sticking object included in the corrected inference data CID or periodically changing a grayscale level of the image sticking object may be used.

Figure 5:
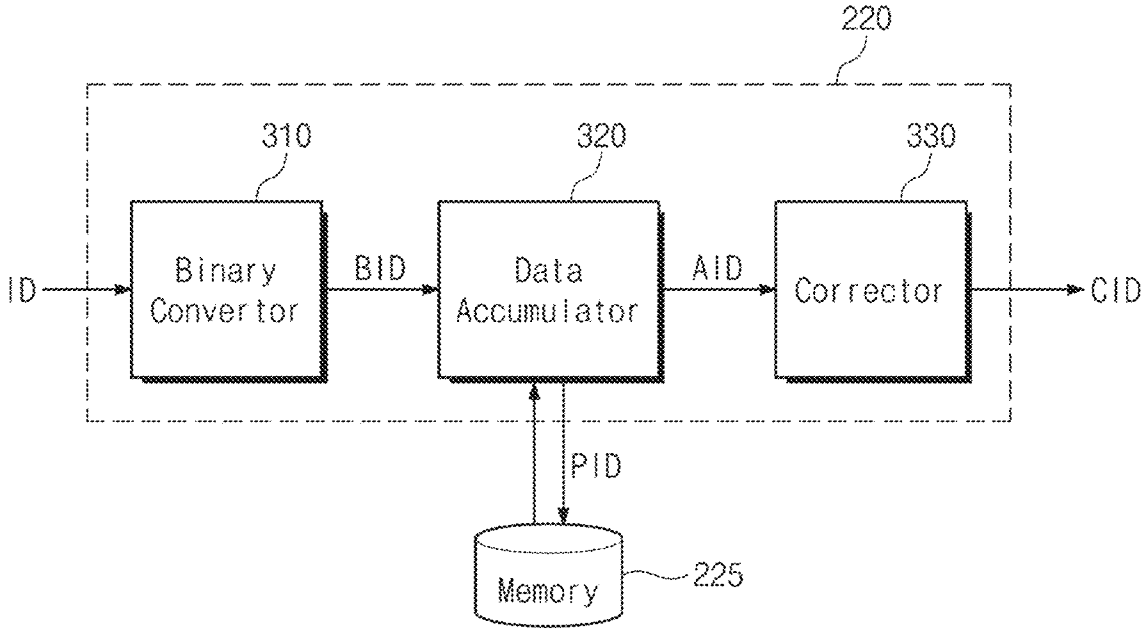
FIG. 5 is a block diagram illustrating a configuration of a post-processor.

FIG. 5 is a block diagram illustrating a configuration of a post-processor.

Figure 6A:
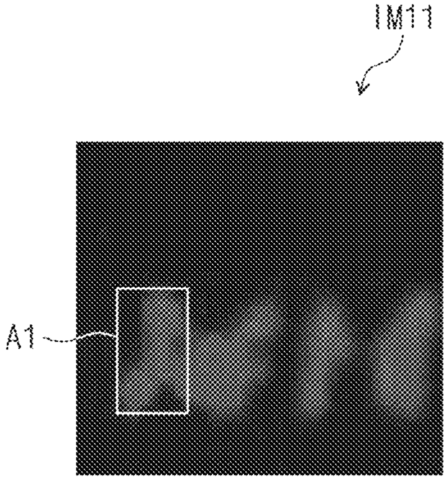
FIG. 6A is a diagram illustrating a broadcaster information image that may be generated by inference data when an image sticking prevention part illustrated in FIG. 3 directly receives inference data output from an image sticking object detector.

FIG. 6A is a diagram illustrating a broadcaster information image that may be generated by the inference data ID when the image sticking prevention part 230 illustrated in FIG. 3 directly receives the inference data ID output from the image sticking object detector 210.

Figure 6B:
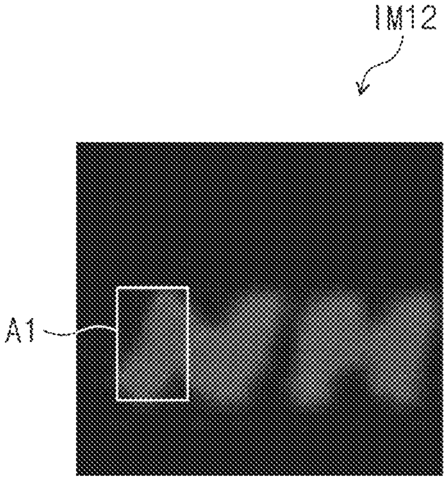
FIG. 6B is a diagram illustrating a broadcaster information image that may be generated by corrected inference data when an image sticking prevention part illustrated in FIG. 3 receives corrected inference data output from a post-processor.

FIG. 6B is a diagram illustrating a broadcaster information image that may be generated by the corrected inference data CID when the image sticking prevention part 230 illustrated in FIG. 3 receives the corrected inference data CID output from the post-processor 220.

Figure 7A:
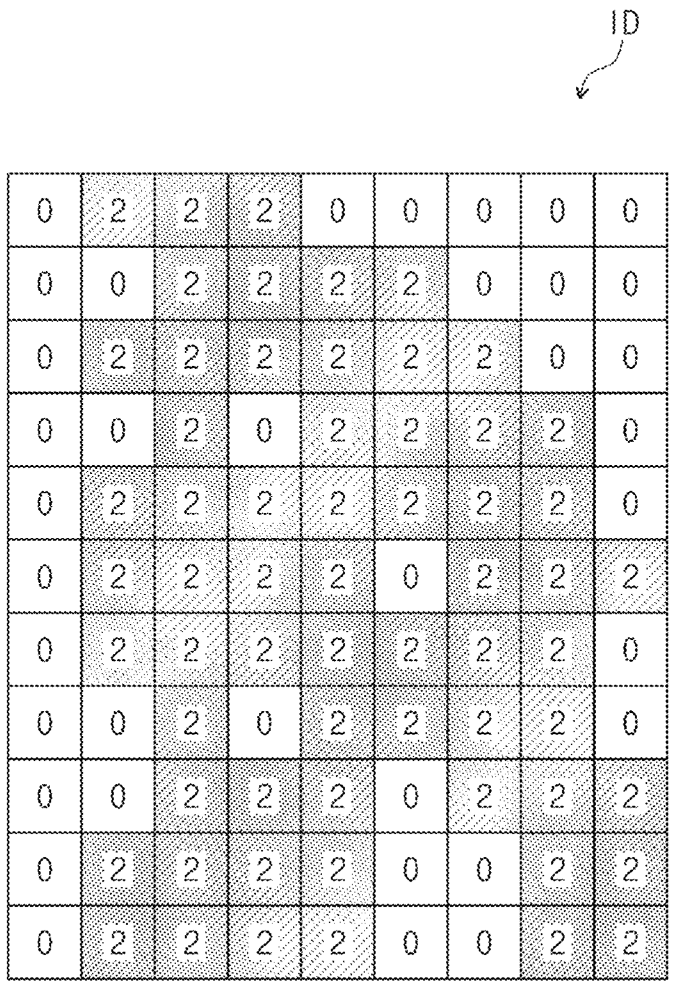
FIG. 7A is a diagram illustrating inference data corresponding to a region of FIG. 6A.

FIG. 7A illustrates the inference data ID corresponding to a region A1 of FIG. 6A.

FIG. 7B illustrates binary inference data BID corresponding to the region A1 of FIG. 6A.

FIG. 7C illustrates the previous inference data PID corresponding to the region A1 of FIG. 6A.

FIG. 7D illustrates initial accumulative inference data AID_i corresponding to the region A1 of FIG. 6A.

Figure 7E:
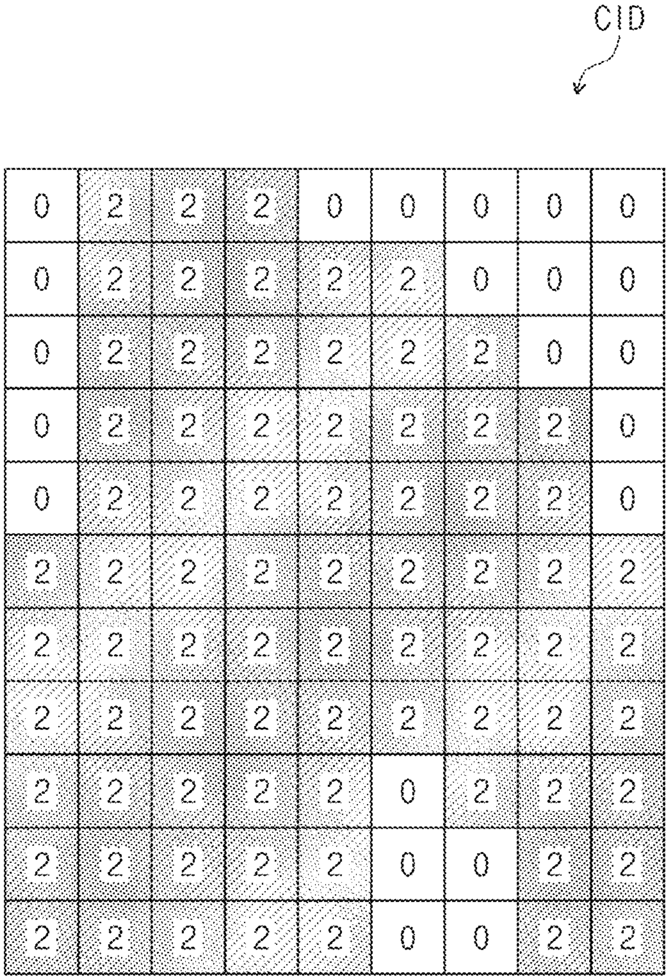
FIG. 7E is a diagram illustrating corrected inference data corresponding to a region of FIG. 6A.

FIG. 7E is a diagram illustrating the corrected inference data CID corresponding to the region A1 of FIG. 6A.

Referring to FIG. 5, the post-processor 220 includes a binary converter 310, a data accumulator 320, and a corrector 330.

The binary converter 310 receives the inference data ID from the image sticking object detector 210 illustrated in FIG. 3. As illustrated in FIG. 7A, the inference data ID may indicate the background as the first class "0" and the broadcaster information as the third class "2", for example. In the example illustrated in FIG. 7A, each of the numbers represents a class of the pixel image signal of a current frame.

Referring to FIGS. 5 and 7B, the binary converter 310 converts the first class "0" corresponding to the background of the inference data ID into a binary number of '0', and converts the third class "2" corresponding to broadcaster information into a binary number of '1'. The binary converter 310 may output the binary inference data BID.

Referring to FIGS. 5 and 7C, the data accumulator 320 reads the previous inference data PID from the memory 225. The previous inference data PID may be inference data accumulated up to the previous frame.

Referring to FIGS. 5 and 7D, the data accumulator 320 generates the initial accumulative inference data AID_i, based on the binary inference data BID received from the binary converter 310 and the previous inference data PID received from the memory 225.

In an embodiment, the initial accumulative inference data AID_i may be calculated by Equation 1 below.

$$\mathrm{AID\_}i=\mathrm{BID}\times R+\mathrm{PID}\times(1-R) \qquad \text{[Equation1]}$$

In Equation 1, 'R' is a mixing ratio of the binary inference data BID and the previous inference data PID. It may be $0<R\leq 1$.

When 'R' is greater than 0.5, a reflection ratio of the binary inference data BID of the current frame is greater than a reflection ratio of the previous inference data PID accumulated up to the previous frame in the initial accumulative inference data AID_i.

When 'R' is less than 0.5, the reflection ratio of the previous inference data PID accumulated up to the previous frame is greater than the reflection ratio of the binary inference data BID of the current frame in the initial accumulative inference data AID_i. Here, the reflection ratio may represent how much corresponding data contributes to the initial accumulative inference data AID_i.

When a difference between the binary inference data BID and the initial accumulative inference data AID_i is less than or equal to a reference value, the data accumulator 320 may output the initial accumulative inference data AID_i as a final accumulative inference data AID to the corrector 330.

When the difference between the binary inference data BID and the initial accumulative inference data AID_i is greater than the reference value, the data accumulator 320 may discard the newly calculated initial accumulative inference data AID_i and may set the binary inference data BID as the final accumulative inference data AID.

In an embodiment, when a user continuously watches a specific channel for several ten minutes to several hours and then changes to another channel, the channel information is changed. In this case, it is appropriate to set the binary inference data BID corresponding to the changed channel information as new, final accumulative inference data AID.

In an example illustrated in FIGS. 7B and 7D, it is assumed that the difference between the binary inference data BID and the initial accumulative inference data AID_i is less than the reference value.

The data accumulator 320 stores the calculated final accumulative inference data AID as the previous inference data PID in the memory 225. The corrector 330 may receive the final accumulative inference data AID from the data accumulator 320 and may output the corrected inference data CID.

The initial accumulative inference data AID_i illustrated in FIG. 7D may mean a probability that the pixel image signal is broadcaster information. In detail, as the initial accumulative inference data AID_i is closer to '1', the probability that the pixel image signal is the broadcaster information is greater. In contrast, as the initial accumulative inference data AID_i is closer to '0', the probability that the pixel image signal is the background is greater.

The corrector 330 may convert the final accumulative inference data AID into the corrected inference data CID, based on a preset criterion. In an embodiment, the corrector 330 converts the final accumulative inference data AID to the first class "0" corresponding to the background when a value of the final accumulative inference data AID is less than a correction reference value (e.g., 0.5), and converts the final accumulative inference data AID to the third class "2" corresponding to the broadcaster information when a value of the final accumulative inference data AID is greater than or equal to the correction reference value (e.g., 0.5). The corrector 330 outputs the corrected inference data CID including the converted class information.

Referring back to FIG. 3, the image sticking prevention part 230 may receive the corrected inference data CID and may output the image data DS subjected to the image sticking prevention process. That is, image sticking prevention part 230 may output the image data DS that is processed to prevent image sticking.

As illustrated in FIGS. 3, 6A, and 7A, the image sticking object detector 210 may detect the image sticking object causing the image sticking, but may include a noise component.

As illustrated in FIGS. 3, 6B, and 7E, the post-processor 220 may use not only the inference data ID of the current frame, but also the previous inference data PID accumulated up to the previous frame to calculate the final accumulative inference data AID. In addition, the post-processor 220 may generate the corrected inference data CID by correcting the final accumulative inference data AID.

In this way, since the image processor 112 may accurately detect the image sticking object included in the input image data RGB, for example, the clock and the broadcaster information that causes the image sticking, an image sticking prevention performance of the image sticking prevention part 230 may be improved.

Figure 8A:
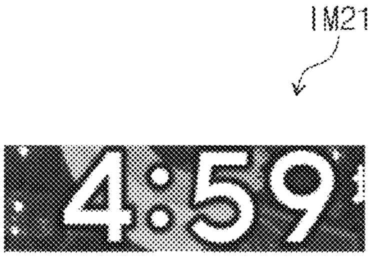
FIG. 8A is a diagram illustrating a clock image IM21 included in an input image data input to an image sticking object detector.

FIG. 8A illustrates a clock image IM21 included in the input image data RGB input to the image sticking object detector 210 as an example.

Figure 8B:
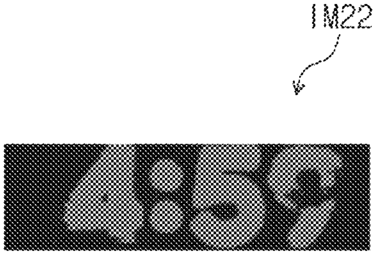
FIG. 8B is a diagram illustrating a clock image that may be generated by inference data output from an image sticking object detector illustrated in FIG. 3.

FIG. 8B is a diagram illustrating a clock image IM22 that may be generated by the inference data ID output from the image sticking object detector 210 illustrated in FIG. 3.

Figure 8C:
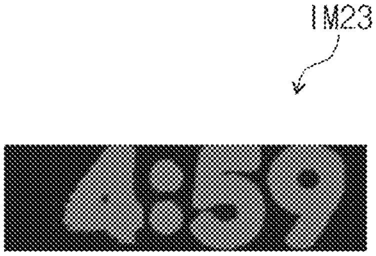
FIG. 8C is a diagram illustrating a clock image that may be generated by corrected inference data output from a post-processor illustrated in FIG. 3.

FIG. 8C is a diagram illustrating a clock image IM23 that may be generated by the corrected inference data CID output from the post-processor 220 illustrated in FIG. 3.

Referring to FIGS. 8A to 8C, it will be understood that the clock image IM23 that may be generated by the corrected inference data CID output from the post-processor 220 is more similar to the clock image IM21 included in the input image data RGB compared to the clock image IM22 that may be generated by the inference data ID output from the image sticking object detector 210.

Figure 9A:
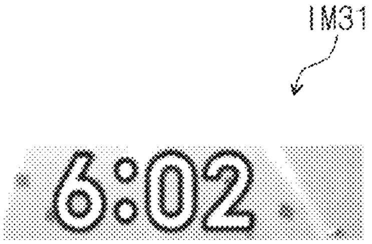
FIG. 9A is a diagram illustrating a clock image included in an input image data input to an image sticking object detector.

FIG. 9A illustrates a clock image IM31 included in the input image data RGB input to the image sticking object detector 210.

Figure 9B:
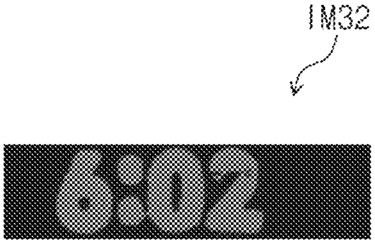
FIG. 9B is a diagram illustrating a clock image that may be generated by inference data output from an image sticking object detector illustrated in FIG. 3.

FIG. 9B is a diagram illustrating a clock image IM32 that may be generated by the inference data ID output from the image sticking object detector 210 illustrated in FIG. 3.

Figure 9C:
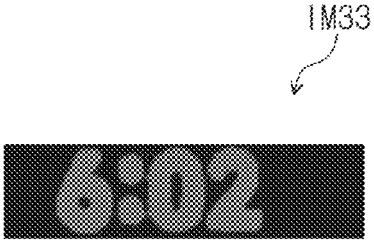
FIG. 9C is a diagram illustrating a clock image that may be generated by the corrected inference data output from the post-processor illustrated in FIG. 3.

FIG. 9C is a diagram illustrating a clock image IM33 that may be generated by the corrected inference data CID output from the post-processor 220 illustrated in FIG. 3.

Referring to FIGS. 9A to 9C, it will be understood that the clock image IM33 that may be generated by the corrected inference data CID output from the post-processor 220 is more similar to the clock image IM31 included in the input image data RGB compared to the clock image IM32 that may be generated by the inference data ID output from the image sticking object detector 210.

Figure 10:
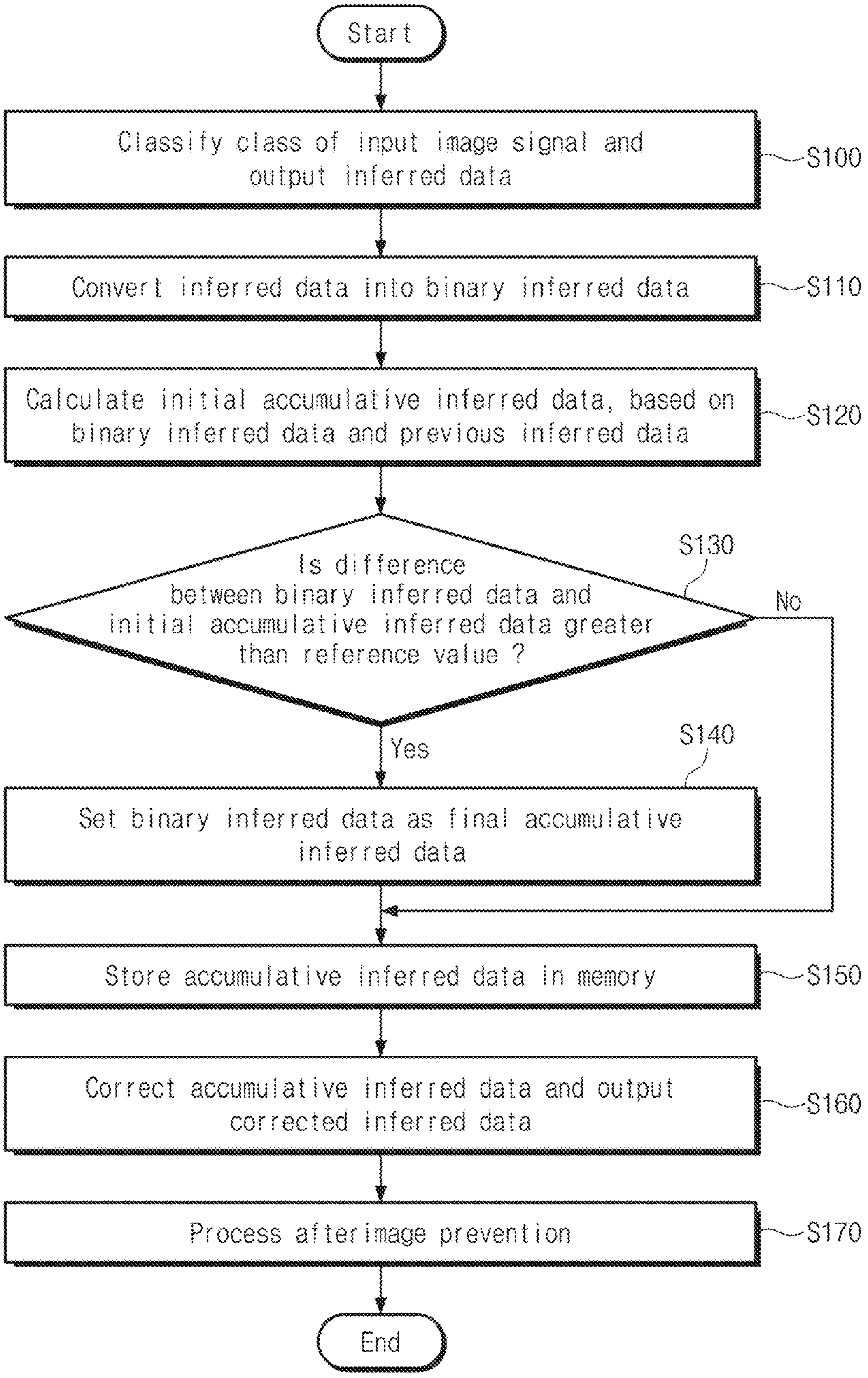
FIG. 10 is a flowchart illustrating an example of an operating method of a display device according to an embodiment of the present disclosure.

FIG. 10 is a flowchart illustrating an example of an operating method of a display device according to an embodiment of the present disclosure.

For convenience of description, an operating method of the display device will be described with reference to an image processor illustrated in FIGS. 3 and 5, but the present disclosure according to the invention is not limited thereto.

Referring to FIGS. 3, 5, and 10, the image sticking object detector 210 classifies a class of the input image data RGB and outputs the inference data ID (operation S100).

The post-processor 220 receives the inference data ID from the image sticking object detector 210. The binary converter 310 in the post-processor 220 converts the inference data ID into the binary inference data BID (operation S110).

As illustrated in FIG. 7A, the inference data ID provided from the image sticking object detector 210, for example, may represent the background as the first class "0", and may represent the broadcaster information as the third class "2". In the example illustrated in FIG. 7A, each of the numbers represents a class of the pixel image signal of the current frame.

In an embodiment, as illustrated in FIG. 7B, the binary converter 310 converts the first class "0" corresponding to the background of the inference data ID into a first value (e.g., a binary number of '0'), and converts the third class "2" corresponding to the broadcaster information (or image sticking object) into a second value (e.g., a binary number of '1'). The binary converter 310 may output the binary inference data BID.

The data accumulator 320 generates the initial accumulative inference data AID_i, based on the binary inference data BID received from the binary converter 310 and the previous inference data PID received from the memory 225 (operation S120).

As Equation 1 described above, the mixing ratio of the binary inference data BID and the previous inference data PID may be variously changed.

The data accumulator 320 compares the difference between the binary inference data BID and the initial accumulative inference data AID_i with the reference value (operation S130).

When the difference between the binary inference data BID and the initial accumulative inference data AID_i is greater than the reference value, the data accumulator 320 may discard the initial accumulative inference data AID_i calculated in operation S120, and may set the binary inference data BID as new, final accumulative inference data AID (operation S140). When the difference between the binary inference data BID and the initial accumulative inference data AID_i is equal to or less than the reference value, the data accumulator 320 may set the initial accumulative inference data AID_i as new, final accumulative inference data AID.

The data accumulator 320 stores the final accumulative inference data AID as the previous inference data PID in the memory 225 (operation S150).

Hereinafter, the final accumulative inference data AID is referred as the accumulative inference data AID. In addition, the data accumulator 320 may output the accumulative inference data AID to the corrector 330.

The corrector 330 may convert the accumulative inference data AID into the corrected inference data CID, based on the preset criterion (operation S160). In an embodiment, the corrector 330 converts the accumulative inference data AID to the first class "0" corresponding to the background when a value of the accumulative inference data AID is less than the correction reference value (e.g., 0.5), and converts the accumulative inference data AID to the third class "2" corresponding to the broadcaster information when a value of the accumulative inference data AID is greater than or equal to the correction reference value (e.g., 0.5), for example. The corrector 330 outputs the corrected inference data CID including the converted class information.

The image sticking prevention part 230 performs the image sticking prevention process (operation S170), based on the corrected inference data CID, and outputs the image data DS that is treated with image sticking prevention process, to the data lines DL1 to DLm (refer to FIG. 1).

According to an embodiment of the present disclosure, an image processor having such a configuration may obtain the inference data about an image displayed for a long time, such as a broadcaster logo or a clock, using a deep neural network. Since the image processor performs post-processing with respect to the inference data, detection performance of an image displayed for a long time, such as the broadcaster logo or the clock may be improved. Accordingly, an image sticking issue of the display device may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image processor comprising:

an image sticking object detector which classifies a class of an input image data of a current frame and outputs inference data including image sticking object information based on the classified class;

a memory which stores previous inference data accumulated up to a previous frame;

a post-processor which calculates final accumulative inference data based on the inference data of the current frame and the previous inference data accumulated up to the previous frame and received from the memory and generates corrected inference data based on the final accumulative inference data; and an image sticking prevention part which outputs an image data subjected to an image sticking prevention process based on the corrected inference data, wherein the memory stores the final accumulative inference data as the previous inference data for a next frame.

2. The image processor of claim 1, wherein the image sticking object detector classifies the input image data as a first class when the input image data corresponds to a background, classifies the input image data as a second class when the input image data corresponds to a clock, and classifies the input image data as a third class when the input image data corresponds to broadcast information.

3. The image processor of claim 1, wherein the post-processor includes:

a binary converter which converts the inference data received from the image sticking object detector into binary inference data;

a data accumulator which calculates initial accumulative inference data and the final accumulative inference data based on the binary inference data and the previous inference data; and a corrector which outputs the corrected inference data based on the final accumulative inference data.

4. The image processor of claim 3, wherein the binary converter converts a class corresponding to a background in the inference data into a first value, and converts a class corresponding to an image sticking object in the inference data into a second value.

5. The image processor of claim 3, wherein, when a difference between the binary inference data and the initial accumulative inference data is greater than a reference value, the data accumulator discards the initial accumulative inference data and sets the binary inference data as the final accumulative inference data.

6. The image processor of claim 5, wherein the data accumulator stores the final accumulative inference data as the previous inference data in the memory.

7. The image processor of claim 3, wherein, when a difference between the binary inference data and the initial accumulative inference data is less than a reference value, the data accumulator stores the initial accumulative inference data as the previous inference data in the memory.

8. The image processor of claim 3, wherein, when a value of the final accumulative inference data is less than a correction reference value, the corrector corrects the final accumulative inference data to a class corresponding to a background, and wherein, when the value of the final accumulative inference data is greater than or equal to the correction reference value, the corrector outputs the corrected inference data obtained by correcting the final accumulative inference data to a class corresponding to an image sticking object.

9. The image processor of claim 3, wherein the data accumulator calculates the initial accumulative inference data based on a sum of the binary inference data and the previous inference data.

10. The image processor of claim 9, wherein the initial accumulative inference data is calculated by the following equation:

$$\text{AID\_}i=\text{BID}\times R+\text{PID}\times(1-R),$$

where AID_i is the initial accumulative inference data, BID is the binary inference data, PID is the previous inference data, and 'R' is a reflection ratio of the binary inference data to the previous inference data.

11. A display device comprising:

a display panel including a plurality of pixels which are connected to a plurality of data lines and a plurality of scan lines;

a data driving circuit which drives the plurality of data lines;

a scan driving circuit which drives the plurality of scan lines; and a driving controller which receives a control signal and an input image data of a current frame, controls the scan driving circuit such that an image is displayed on the display panel, and provides an image data to the data driving circuit, wherein the driving controller includes:

an image sticking object detector which classifies a class of the input image data and outputs inference data including image sticking object information based on the classified class;

a memory which stores previous inference data accumulated up to a previous frame;

a post-processor which calculates final accumulative inference data based on the inference data of the current frame and the previous inference data accumulated up to the previous frame and received from the memory and generates corrected inference data based on the final accumulative inference data; and an image sticking prevention part which outputs the image data subjected to an image sticking prevention process based on the corrected inference data, wherein the memory stores the final accumulative inference data as the previous inference data for a next frame.

12. The display device of claim 11, wherein the image sticking object detector classifies the input image data as a first class when the input image data corresponds to a background, classifies the input image data as a second class when the input image data corresponds to a clock, and classifies the input image data as a third class when the input image data corresponds to broadcast information.

13. The display device of claim 11, wherein the post-processor includes:

a binary converter which converts the inference data received from the image sticking object detector into binary inference data;

a data accumulator which calculates initial accumulative inference data and the final accumulative inference data based on the binary inference data and the previous inference data; and a corrector which outputs the corrected inference data based on the final accumulative inference data.

14. The display device of claim 13, wherein the binary converter converts a class corresponding to a background in the inference data into a first value, and converts a class corresponding to an image sticking object in the inference data into a second value.

15. The display device of claim 13, wherein, when a difference between the binary inference data and the initial accumulative inference data is greater than a reference value, the data accumulator discards the initial accumulative inference data and sets the binary inference data as the final accumulative inference data.

16. The display device of claim 13, wherein the data accumulator stores the final accumulative inference data as the previous inference data in the memory.

17. The display device of claim 13, wherein the data accumulator calculates the initial accumulative inference data based on a sum of the binary inference data and the previous inference data.

18. A method of driving a display device, the method comprising:

classifying a class of an input image data of a current frame, and outputting inference data including image sticking object information based on the classified class;

calculating final accumulative inference data based on the inference data of the current frame and previous inference data accumulated up to a previous frame and received from a memory;

generating corrected inference data based on the final accumulative inference data; and outputting an image data, subjected to an image sticking prevention process based on the corrected inference data, to a data line of the display device, wherein the memory stores the final accumulative inference data as the previous inference data for a next frame.

19. The method of claim 18, wherein the calculating of the final accumulative inference data includes:

converting the inference data into binary inference data; and calculating initial accumulative inference data and the final accumulative inference data based on the binary inference data and the previous inference data.

20. The method of claim 19, wherein the calculating of the initial accumulative inference data and the final accumulative inference data includes:

when a difference between the binary inference data and the initial accumulative inference data is greater than a reference value, discarding the initial accumulative inference data, and setting the binary inference data as the final accumulative inference data.

* * * * *